(12) United States Patent
Harada

(10) Patent No.: US 11,403,049 B2
(45) Date of Patent: Aug. 2, 2022

(54) PRINTING SYSTEM, NON-TRANSITORY RECORDING MEDIUM, AND PRINT CONTROL METHOD

(71) Applicant: Kohtaroh Harada, Kanagawa (JP)

(72) Inventor: Kohtaroh Harada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/062,739

(22) Filed: Oct. 5, 2020

(65) Prior Publication Data

US 2021/0132875 A1    May 6, 2021

(30) Foreign Application Priority Data

Oct. 31, 2019   (JP) .............................. JP2019-198957

(51) Int. Cl.
*G06F 3/12*   (2006.01)

(52) U.S. Cl.
CPC .......... *G06F 3/1208* (2013.01); *G06F 3/1241* (2013.01); *G06F 3/1276* (2013.01); *G06F 3/1286* (2013.01); *G06F 3/1288* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,752,021 | B2 * | 8/2020 | Yamada | ................... H04N 1/56 |
| 2006/0019187 | A1 | 1/2006 | Nakamura | |
| 2010/0007902 | A1 * | 1/2010 | Kikuchi | ................ G06F 3/1253 |
| | | | | 358/1.9 |
| 2012/0081766 | A1 * | 4/2012 | Mori | ........................ H04N 1/46 |
| | | | | 358/505 |
| 2013/0222817 | A1 * | 8/2013 | Suzuki | ............... G03G 15/6585 |
| | | | | 358/1.1 |
| 2015/0078769 | A1 * | 3/2015 | Kogusuri | ........... G03G 15/6585 |
| | | | | 399/39 |
| 2017/0039014 | A1 * | 2/2017 | Mori | .................. H04N 1/00347 |
| 2017/0041495 | A1 * | 2/2017 | Ihara | .................. H04N 1/32309 |
| 2019/0164026 | A1 * | 5/2019 | Masuda | ............... G06K 15/102 |
| 2019/0196754 | A1 | 6/2019 | Minegishi | |
| 2020/0278618 | A1 * | 9/2020 | Kanatani | ................ G03G 9/122 |
| 2021/0029259 | A1 * | 1/2021 | Takeuchi | .............. G06F 3/1208 |

FOREIGN PATENT DOCUMENTS

| | | |
|---|---|---|
| JP | 2006-038933 | 2/2006 |
| JP | 2010-020578 | 1/2010 |
| JP | 2012-058977 | 3/2012 |
| JP | 2016-002735 | 1/2016 |

* cited by examiner

*Primary Examiner* — Helen Zong
(74) *Attorney, Agent, or Firm* — Harness, Dickey & Pierce, P.L.C.

(57) ABSTRACT

A printing system, a non-transitory recording medium, and a print control method. The printing system adds a command for instructing printing with special color material to a single color page in first print data, the first print data having been generated based on image data including the single color page in which an object is drawn in single color, transmits to the image forming apparatus, second print data that has the command added, and prints the single color page in the second print data with the special color material.

13 Claims, 9 Drawing Sheets

PRINTING SYSTEM, NON-TRANSITORY RECORDING MEDIUM, AND PRINT CONTROL METHOD

CROSS-REFERENCE TO RELATED APPLICATIONS

This patent application is based on and claims priority pursuant to 35 U.S.C. § 119(a) to Japanese Patent Application No. 2019-198957, filed on Oct. 31, 2019, in the Japan Patent Office, the entire disclosure of which is hereby incorporated by reference herein.

BACKGROUND

Technical Field

The present disclosure relates to a printing system, a non-transitory recording medium, and a print control method.

Background Art

Toner used for image formation in a laser printer or the like is required to have various characteristics from viewpoints of development, transfer, fixing and image quality. For example, a technique of forming an image with a toner that reflects or absorbs light of a specific wavelength has been devised, such as a technique for forming an image by mixing an infrared absorbent with toners of colors such as cyan (C), magenta (M), yellow (Y), and black (K).

SUMMARY

Embodiments of the present disclosure describe a printing system, a non-transitory recording medium, and a print control method. The printing system adds a command for instructing printing with special color material to a single color page in first print data, the first print data having been generated based on image data including the single color page in which an object is drawn in single color, transmits to the image forming apparatus, second print data that has the command added, and prints the single color page in the second print data with the special color material.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
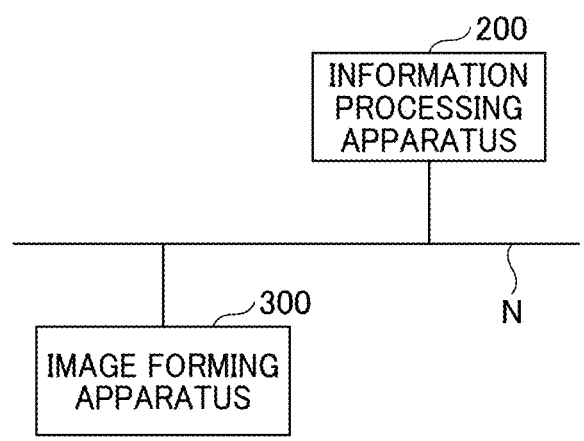
FIG. 1 is a diagram illustrating an example of a schematic configuration of a printing system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Embodiments are described below with reference to the drawings. FIG. 1 is a diagram illustrating an example of a schematic configuration of a printing system.

The printing system 100 of the present embodiment includes an information processing apparatus 200 and an image forming apparatus 300. In the printing system 100, the information processing apparatus 200 and the image forming apparatus 300 are connected through a communication network N or the like.

Note that, in the example of FIG. 1, the information processing apparatus 200 and the image forming apparatus 300 included in the printing system 100 are each one unit, but the number of the information processing apparatus 200 and the image forming apparatus 300 included in the printing system 100 are not limited. In the printing system 100 of the present embodiment, in the information processing apparatus 200, for example, print data including an image, a document, etc. is created by general application software.

General application software is application software that handles only red green and blue (RGB) data. In other words, general application software does not have, for example, a layer function of superposing images drawn on a plurality of layers, and cannot designate a specific color different from C, M, Y, and K (hereinafter referred to as a special color). In the following description, the application software may be simply referred to as an application.

The special color in the present embodiment is primary color other than C, M, Y, and K. For example, gold, silver, white or transparent. Since some image forming apparatuses (especially inkjet type) can use inks of different colors in addition to C, M, Y, and K, the special color may be different in the image forming apparatuses. In other words, the special color is a color that the application software cannot represent in RGB.

In the printing system 100 of the present embodiment, the image forming apparatus 300 is a color printer that prints with a combination of four colors of C, M, Y, and K.

Further, the image forming apparatus 300 according to the present embodiment may not have a function of designating printing with special color toner, and the special color may be assigned to K, and the special color material may be stored in the K toner cartridge. In this case, the image forming apparatus 300 converts the RGB print data output by a printer driver into C, M. and Y print data. At this time, black (K) is represented only by C, M, and Y of C, M, Y, and K.

As described above, the image forming apparatus 300 of the present embodiment assigns the special color to K by utilizing the fact that black can be printed without K.

The special color material stored in the K toner cartridge is a color material such as toner or ink capable of printing the special color. In the present embodiment, the special color material may be transparent toner. Transparent means invisible to light of a certain wavelength. In this case, it is not required that the image cannot be completely seen, and it may be invisible at first glance or an imaging device cannot pick up an image. Further, the transparent toner or ink may be referred to as stealth toner or stealth ink. In the following description, the transparent toner may be called a special color toner.

Since the special color material can form information capable of determining the authenticity of an output product, the special color toner has an effect of preventing duplication of the output product. The special color material may be called a consumer product for security since security is improved.

In the printing system 100 of the present embodiment, even if the information processing apparatus 200 and the image forming apparatus 300 do not have the function of designating the special color, the special color image can be printed.

Figure 2:
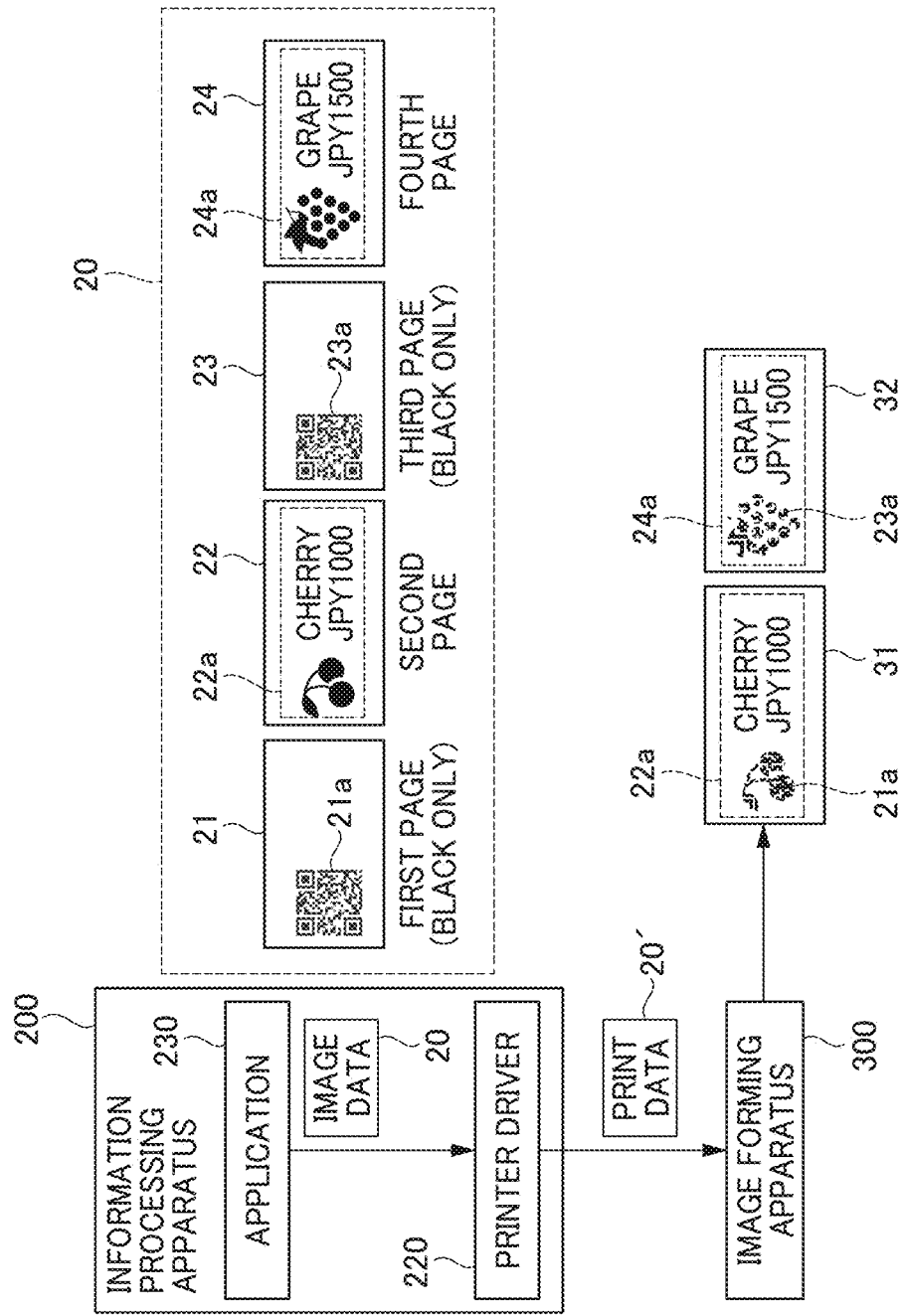
FIG. 2 is a diagram illustrating an outline of operation of the printing system.

An outline of the operation of the printing system 100 according to the present embodiment is described below with reference to FIG. 2. FIG. 2 is a diagram illustrating an outline of operation of the printing system.

The information processing apparatus 200 of the present embodiment executes various control programs such as an operating system (OS) and a printer driver, and an application 230, and provides a function according to the application.

The control program is, for example, a program called a device driver. The device driver is software prepared for controlling the hardware and the like connected to a personal computer by the OS, and an example thereof is a printer driver 220.

In the information processing apparatus 200 of the present embodiment, the application 230 creates image data 20 according to user's operation and passes the image data to the printer driver 220. In the following description, the image data 20 is assumed to include an object to be printed by the special color toner. The object is a part or the whole of a printed document or image.

In the present embodiment, the image data 20 is created such that the page to be printed by the special color toner and the page on which normal printing is to be performed are different pages.

More specifically, the image data 20 of the present embodiment is created by the user such that the object to be printed by the special color toner and the object to be normally printed are separate pages. Note that normal printing is printing performed by converting RGB into C, M, and Y.

Further, in the present embodiment, the object drawn in a single color is the object to be printed by the special color toner, and an object drawn in multiple colors is the object on which normal printing is to be performed.

In the image data 20 illustrated in FIG. 2, an object 21a of page 21 and an object 23a of page 23 are objects drawn in the single color and are the objects to be printed by the special color toner. Further, in the image data 20, an object 22a of the page 22 and an object 24a of the page 24 are the objects drawn in the multiple colors and are objects on which normal printing is to be performed.

Therefore, in the image data 20, the pages 21 and 23 including the objects 21a and 23a and the pages 22 and 24 on which normal printing is to be performed are created as separate pages. The pages 21 and 23 in which the object is drawn in the single color are examples of single color pages. The pages 22 and 24 in which the objects are drawn in the multiple colors are examples of pages other than the single color page.

When the image data 20 is input from the application 230, the printer driver 220 of the present embodiment generates print data based on the image data 20. Then, the printer driver 220 analyzes the print data on a page-by-page basis, sets a page including only an object drawn in the single color as a page to be printed by the special color toner, and adds a command to the print data, indicating that the print target is to be printed by the special color toner.

In the example of FIG. 2, the printer driver 220 generates print data 20' in which the command indicating that the page 21 and the page 23 included in the image data 20 are to be printed by the special color toner is added.

Then, the printer driver 220 outputs the print data 20' with the added command to the image forming apparatus 300.

In other words, the information processing apparatus 200 receives the image data 20 including the single color page and generates print data (first print data) based on the image data 20. Then, when the print data includes the single color page, the information processing apparatus 200 converts the print data to print data 20' (second print data) to which the command for instructing printing with the special color toner for the single color page is added and transmits to the image forming apparatus 300.

When the print data 20' is input, the image forming apparatus 300 interprets the command included in the print data 20'. Then, the image forming apparatus 300 prints the page to be printed with the special color toner by superimposing the page on the next page.

In the example of FIG. 2, in the printed matter 31 output by the image forming apparatus 300, the page 21 that is the target of the special color printing is printed while being superimposed on the page 22 that is the next page of the page 21.

In other words, when the image forming apparatus 300 receives the print data 20' to which the command is added, of the pages included in the print data 20', the single color page is overlaid and printed with the special color toner on a recording medium on which another page different from the single color page is printed.

More specifically, in the printed matter 31, an object 21a and an object 22a are formed in a superimposing manner, the object 21a is formed by special color, and the object 22a is formed by the multiple colors.

The printed matter 32 is printed by superimposing the page 23 and the page 24 and is formed by overlapping the object 23a and the object 24a. The object 23a is formed by the special color, and the object 24a is formed by the multiple colors.

As described above, according to the present embodiment, even in the case of print data generated by the application 230 that can handle only RGB, an image formed by the special color and an image formed by the multiple colors can be generated in the superimposed manner.

In other words, according to the present embodiment, it is possible to print the special color without using an application that can designate the special color. In addition, according to the present embodiment, it is possible to form an image in which an object that has been printed normally and an object that has been printed with the special color are superimposed without using an application having a layer function.

Further, in the printing system 100 of the present embodiment, the printer driver 220 automatically determines the page to be printed by the special color toner. Therefore, according to the present embodiment, the user does not need to designate the page to be printed by the special color toner each time, and the user's effort can be saved.

The image forming apparatus 300 according to the present embodiment may use an image forming apparatus (C, M, Y. K, and special color) that can designate and print the special color without using the toner of the special color K.

Further, in the example of FIG. 2, the object to be printed by the special color toner is the Quick Response (QR) code (registered trademark), but the object is not limited to the QR code. The object to be printed with the special color toner may be a two-dimensional code other than the QR code, or may be a character, a number, a symbol, an alphabet, a figure, a photograph, or the like. The object to be printed with the special color toner may be any object that can be expressed in two dimensions. Further, the object to be printed by the special color toner may be an image in the area selected by the user or a document in any location selected by the user.

Further, in the example of FIG. 2, the single color page is printed with the special color toner on the recording medium on which another page different from the single color page is printed, but the order of printing the single color page and another page is not limited, as long as the single color page is printed with the special color toner, in the present embodiment.

A hardware configuration of each device included in the printing system 100 according to the present embodiment is described below with reference to FIGS. 3 and 4.

Figure 3:
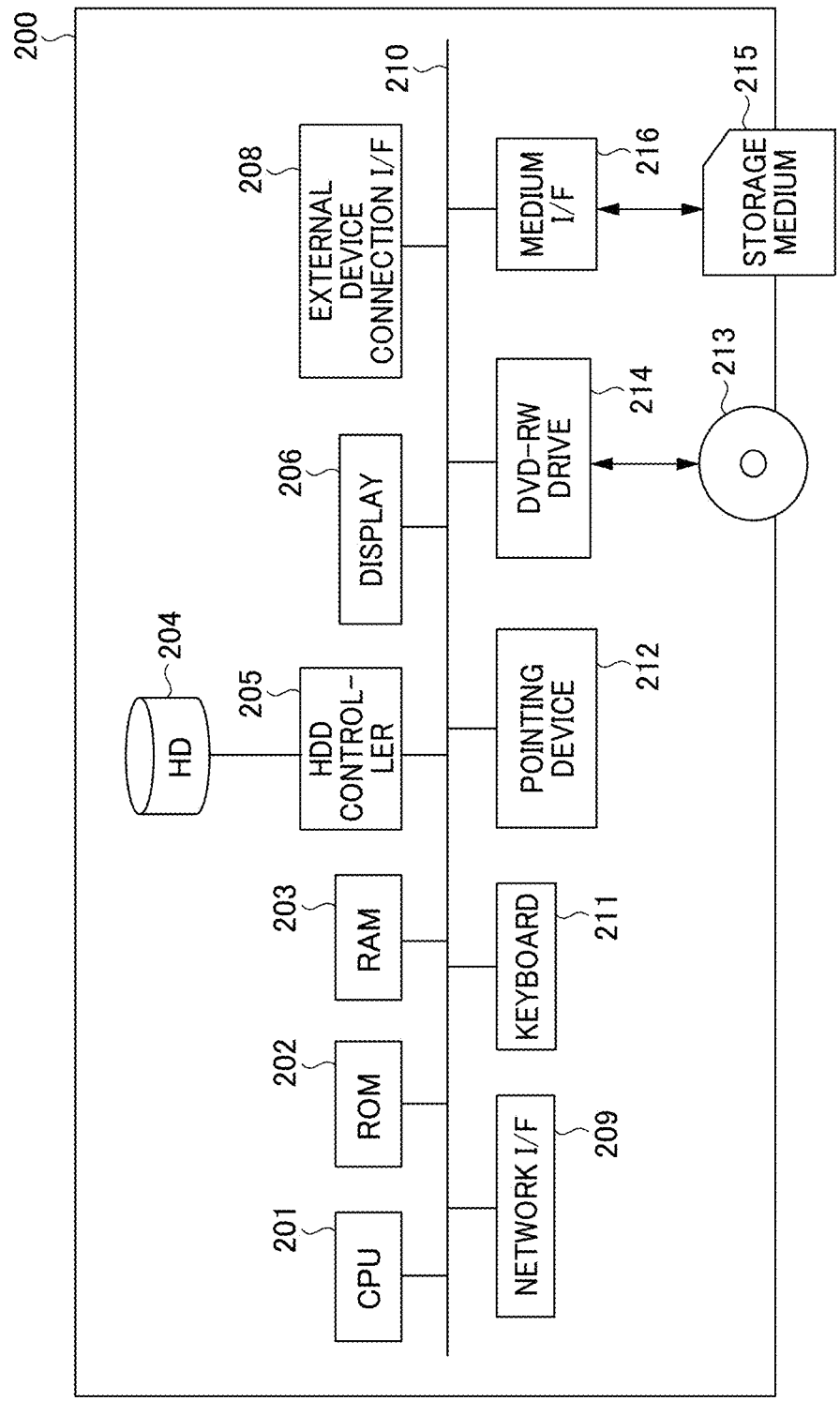
FIG. 3 is a diagram illustrating an example of a hardware configuration of an information processing apparatus.

FIG. 3 is a diagram illustrating an example of the hardware configuration of the information processing apparatus. The information processing apparatus 200 is implemented by a computer, and includes as illustrated in FIG. 3, a central processing unit (CPU) 201, a read only memory (ROM) 202, a random access memory (RAM) 203, a hard disk (HD) 204, a hard disk drive (HDD) controller 205, a display 206, an external device connection interface (I/F) 208, network I/F 209, data bus 210, keyboard 211, pointing device 212, a Digital Versatile Disk Rewritable (DVD-RW) drive 214, and a medium I/F 216.

The CPU 201 controls entire operation of the information processing apparatus 200. The ROM 202 stores a program used for driving the CPU 201 such as an initial program loader (IPL). The RAM 203 is used as a work area for the CPU 201. The HD 204 stores various data such as a control program. The HDD controller 205 controls reading and writing of various data from and to the HD 204 under control of the CPU 201. The display 206 displays various information such as a cursor, menu, window, character, or image. The external device connection I/F 208 is an interface for connecting various external devices. The external device in this case is, for example, a universal serial bus (USB) memory or a printer. The network I/F 209 is an interface that controls communication of data through a communication network. The data bus 210 is an address bus or a data bus, which electrically connects the elements in FIG. 3 such as the CPU 201.

The keyboard 211 is an example of an input device provided with a plurality of keys for allowing a user to input characters, numerals, or various instructions. The pointing device 212 is an example of an input device that allows a user to select or execute a specific instruction, select a target for processing, or move a cursor being displayed. The DVD-RW drive 214 reads and writes various data from and to a DVD-RW 213, which is an example of a removable storage medium. The removable storage medium is not limited to the DVD-RW and may be a digital versatile disc-recordable (DVD-R) or the like. The medium I/F 216 controls reading and writing (storing) of data from and to the storage medium 215 such as a flash memory.

The information processing apparatus 200 of the present embodiment may be, for example, a smartphone, a tablet terminal, a personal digital assistant (PDA), a wearable personal computer (PC), or the like.

Figure 4:
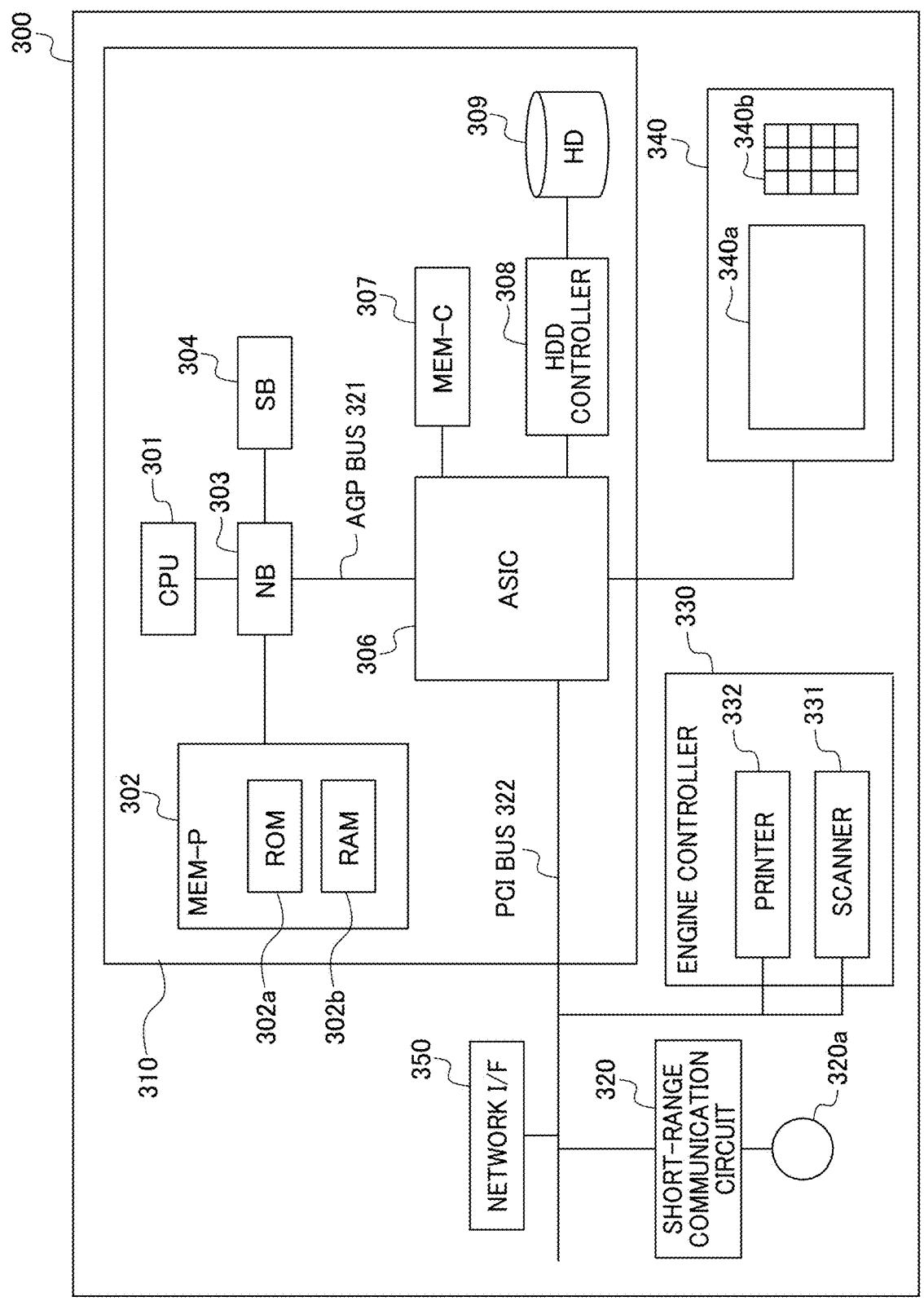
FIG. 4 is a diagram illustrating an example of a hardware configuration of an image forming apparatus.

FIG. 4 is a diagram illustrating an example of a hardware configuration of an image forming apparatus. The image forming apparatus (MFP (Multifunction Peripheral/Product/Printer)) 300 according to the present embodiment includes a controller 310, a short-range communication circuit 320, an engine controller 330, a control panel 340, and a network I/F 350.

The controller 310 includes a CPU 301 as a main processor, a system memory (MEM-P) 302, a north bridge (NB) 303, a south bridge (SB) 304, an Application Specific Integrated Circuit (ASIC) 306, a local memory (MEM-C) 307, an HDD controller 308, and an HD 309 as a storage unit. The NB 303 and the ASIC 306 are connected through an Accelerated Graphics Port (AGP) bus 321.

The CPU 301 is a processor that performs overall control of the MFP 9. The NB 303 connects the CPU 301 with the MEM-P 302, SB 304, and AGP bus 321. The NB 303 includes a memory controller for controlling reading or writing of various data with respect to the MEM-P 302, a Peripheral Component Interconnect (PCI) master, and an AGP target.

The MEM-P 302 includes a ROM 302a as a memory that stores program and data for implementing various functions of the controller 310. The MEM-P 302 further includes a RAM 302b as a memory that deploys the program and data, or as a drawing memory that stores drawing data for printing. The program stored in the ROM 302a may be stored in any computer-readable storage medium, such as a compact disc-read only memory (CD-ROM), compact disc-recordable (CD-R), or digital versatile disc (DVD), in a file format installable or executable by the computer for distribution.

The SB 304 connects the NB 303 with a peripheral component interconnect (PCI) device or a peripheral device. The ASIC 306 is an integrated circuit (IC) dedicated to an image processing use, and connects the AGP bus 321, a PCI bus 322, the HDD controller 308, and the MEM-C 307. The ASIC 306 includes a PCI target, an AGP master, an arbiter (ARB) as a central processor of the ASIC 306, a memory controller for controlling the MEM-C 307, a plurality of direct memory access controllers (DMACs) capable of converting coordinates of image data with a hardware logic, and a PCI unit that transfers data between a scanner 331 and a printer 332 through the PCI bus 322. The ASIC 306 may be connected to a Universal Serial Bus (USB) interface, or the Institute of Electrical and Electronics Engineers 1394 (IEEE 1394) interface.

The MEM-C 307 is a local memory used as a buffer for image data to be copied or a code buffer. The HD 309 is a storage for storing image data, font data used during printing, and forms. The HDD controller 308 reads or writes various data from or to the HD 309 under control of the CPU

301. The AGP bus 321 is a bus interface for a graphics accelerator card, which has been proposed to accelerate graphics processing. Through directly accessing the MEM-P 302 by high-throughput, speed of the graphics accelerator card is improved.

Further, the short-range communication circuit 320 includes an antenna for short-range communication circuit 320a. The short-range communication circuit 320 is a communication circuit that communicates in compliance with the Near Field Communication (NFC), the Bluetooth (registered trademark) and the like.

The engine controller 330 includes a scanner 331 and a printer 332. The control panel 340 includes a display panel 340a and operation panel 340b. The display panel 340a is implemented by, for example, a touch panel that displays current settings or a selection screen and receives a user input. The operation panel 340b includes a numeric keypad that receives set values of various image forming parameters such as image density parameter and a start key that accepts an instruction for starting copying. The controller 310 controls entire operation of the MFP 9. For example, the controller 310 controls drawing, communication, or user inputs to the control panel 340. The scanner 331 or the printer 332 includes an image processing unit such as error diffusion processing and gamma conversion processing.

In response to an instruction to select a specific application through the control panel 340, for example, using a mode switch key, the MFP 9 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 350 is an interface that controls communication of data through a communication network N. The short-range communication circuit 320 and the network IF 350 are electrically connected to the ASIC 306 through the PCI bus 322.

Figure 5:
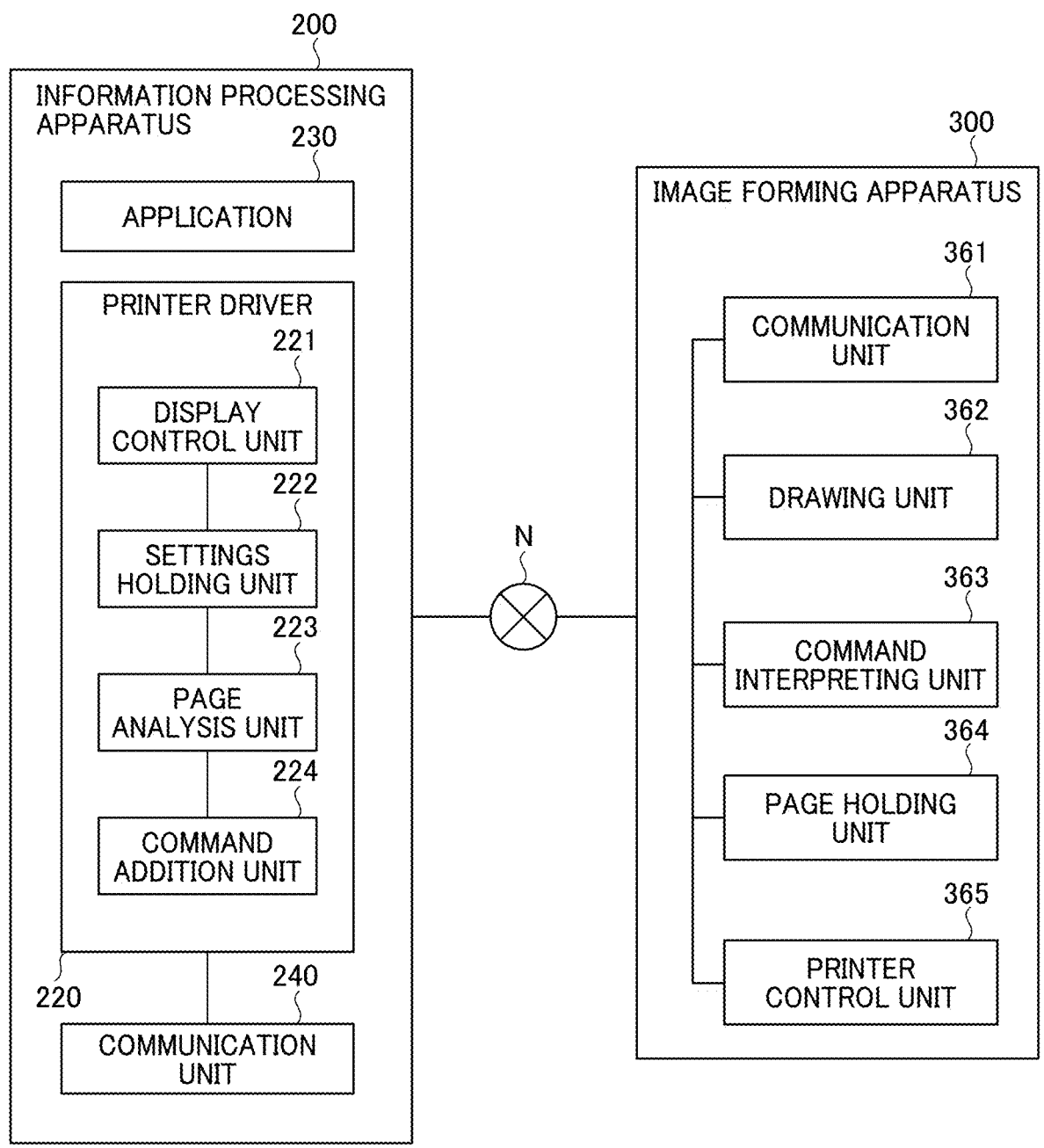
FIG. 5 is a diagram illustrating a functional configuration of each device included in the printing system.

A functional configuration of each device included in the printing system 100 according to the present embodiment is described with reference to FIG. 5. FIG. 5 is a diagram illustrating the functional configuration of each device included in the printing system.

The information processing apparatus 200 of the present embodiment includes a printer driver 220 and a communication unit 240.

The printer driver 220 of the present embodiment is a program for controlling the image forming apparatus 300 and is stored in the ROM 202 or the like. Each unit of the printer driver 220 of the present embodiment is implemented by the CPU 201 reading and executing the printer driver 220 stored in the ROM 202.

The printer driver 220 generates print data based on the image data received from the application 230. Further, the printer driver 220 of the present embodiment includes a display control unit 221, a settings holding unit 222, a page analysis unit 223, and a command addition unit 224.

The display control unit 221 causes the display 206 or the like to display a screen related to the settings of the image forming apparatus 300. More specifically, for example, in the image forming apparatus 300, the display control unit 221 causes the display 206 or the like to display a setting screen regarding printing using the special color toner.

The settings holding unit 222 holds information indicating the setting content input on the setting screen displayed by the display control unit 221. More specifically, the settings holding unit 222 holds, for example, information indicating the setting contents regarding printing using the special color toner. In the following description, the information held in the settings holding unit 222 may be referred to as settings information.

The page analysis unit 223 analyzes the print data page by page and determines whether each page is drawn in the single color. In other words, the page analysis unit 223 determines whether the page data included in the print data is a target for printing with the special color toner. The page analysis unit 223 notifies the command addition unit 224 of a command addition instruction according to the determination result.

The page data according to the present embodiment is an object for one page displayed on the display 206.

In response to receiving a notification from the page analysis unit 223, the command addition unit 224 adds a command instructing execution of printing with the special color toner to the corresponding page of the print data to form the print data 20'. Specifically, the command addition unit 224 may add a command for instructing execution of printing with the special color toner, for example, to the top of page data determined to be the target of printing with the special color toner. In the following description, the command for instructing printing with the special color toner may be called a special color print command.

The communication unit 240 transmits the print data to the image forming apparatus 300. The communication unit 240 is implemented by the network I/F 209.

The image forming apparatus 300 according to the present embodiment includes a communication unit 361, a drawing unit 362, a command interpreting unit 363, a page holding unit 364, and a printer control unit 365. The drawing unit 362, the command interpreting unit 363, the page holding unit 364, and the printer control unit 365 are implemented by the controller 310. More specifically, the drawing unit 362, the command interpreting unit 363, and the printer control unit are implemented by a processor such as a CPU 301. The page holding unit 364 is implemented by the memory of the controller 310.

The communication unit 361 according to the present embodiment receives the print data transmitted from the printer driver 220. The communication unit 361 is implemented by the network I/F 350.

The drawing unit 362 analyzes the print data received by the communication unit 361 for each page and creates drawing data for each print page. If the special color print command has been added, the drawing unit 362 causes the page holding unit 364 to hold the drawing data of the analysis target page (single color page) and creates the drawing data of the next page. The drawing data is data for printing in a data format that can be interpreted by the printer engine of the image forming apparatus 300.

The command interpreting unit 363 interprets the command included in the print data and returns the interpretation result to the drawing unit 362. Specifically, the command interpreting unit 363 determines whether the command included in the print data is a special color print command and notifies the drawing unit 362 if the command is a special color print command.

The page holding unit 364 temporarily holds the drawing data of the single color page created by the drawing unit 362.

The printer control unit 365 transfers the drawing data transferred from the drawing unit 362 to the engine controller 330 and causes the printer 332 to draw the image indicated by the drawing data. In other words, the printer control unit 365 controls the printer to print the image indicated by the drawing data.

Figure 6:
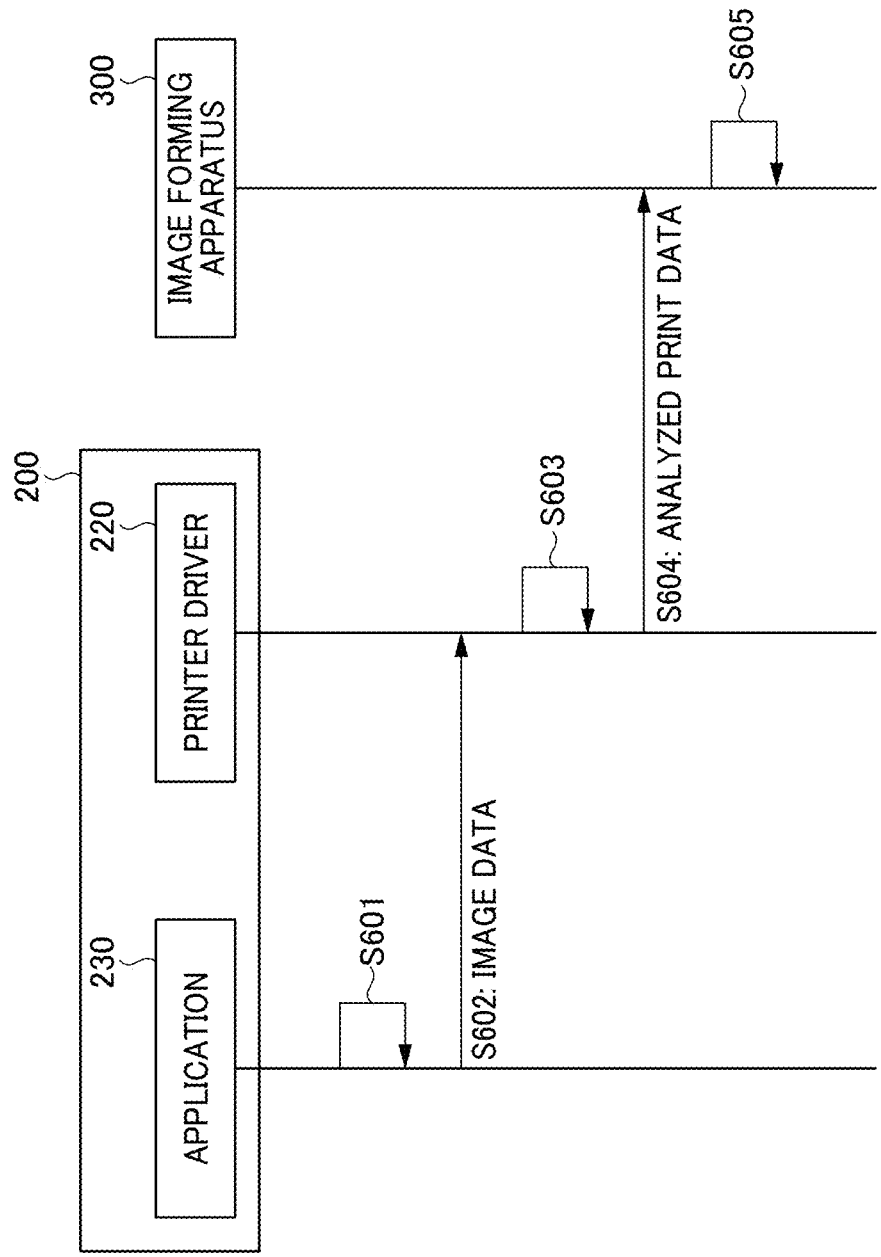
FIG. 6 is a sequence diagram illustrating an operation of the printing system.

The operation of the printing system 100 according to the present embodiment is described below with reference to FIG. 6. FIG. 6 is a sequence diagram illustrating an operation of the printing system.

In the printing system 100 of the present embodiment, image data is created by operating the application 230 in the information processing apparatus 200 in step S601. The application 230 may be, for example, a document creation application or a spreadsheet application.

In the information processing apparatus 200, when the application 230 receives an instruction to print the image data, the application 230 transfers the image data to the printer driver 220 in step S602.

Upon receiving the image data, the printer driver 220 of the information processing apparatus 200 analyzes the image data to generate print data in step S603 and transmits the print data to the image forming apparatus 300 by the communication unit 240 in step S604.

In response to receiving the print data, the image forming apparatus 300 outputs a printed matter corresponding to the print data in step S605. In other words, when the image forming apparatus 300 receives the print data, the image forming apparatus 300 draws and outputs an image based on the print data on the recording medium. Details of steps S603 and S605 are described below.

The recording medium on which the image forming apparatus 300 forms an image may be any recording medium to which toner or ink can be attached. The recording medium refers to a medium to which toner or ink can be temporarily attached, such as a medium to which toner or ink adheres and is fixed or permeates. Specific examples thereof include recording media such as paper, recording paper, recording media made of film or cloth, electronic substrates, electronic components such as piezoelectric elements, powder layers, and the like, and unless otherwise specified, includes anything to which toner or ink adheres.

Figure 7:
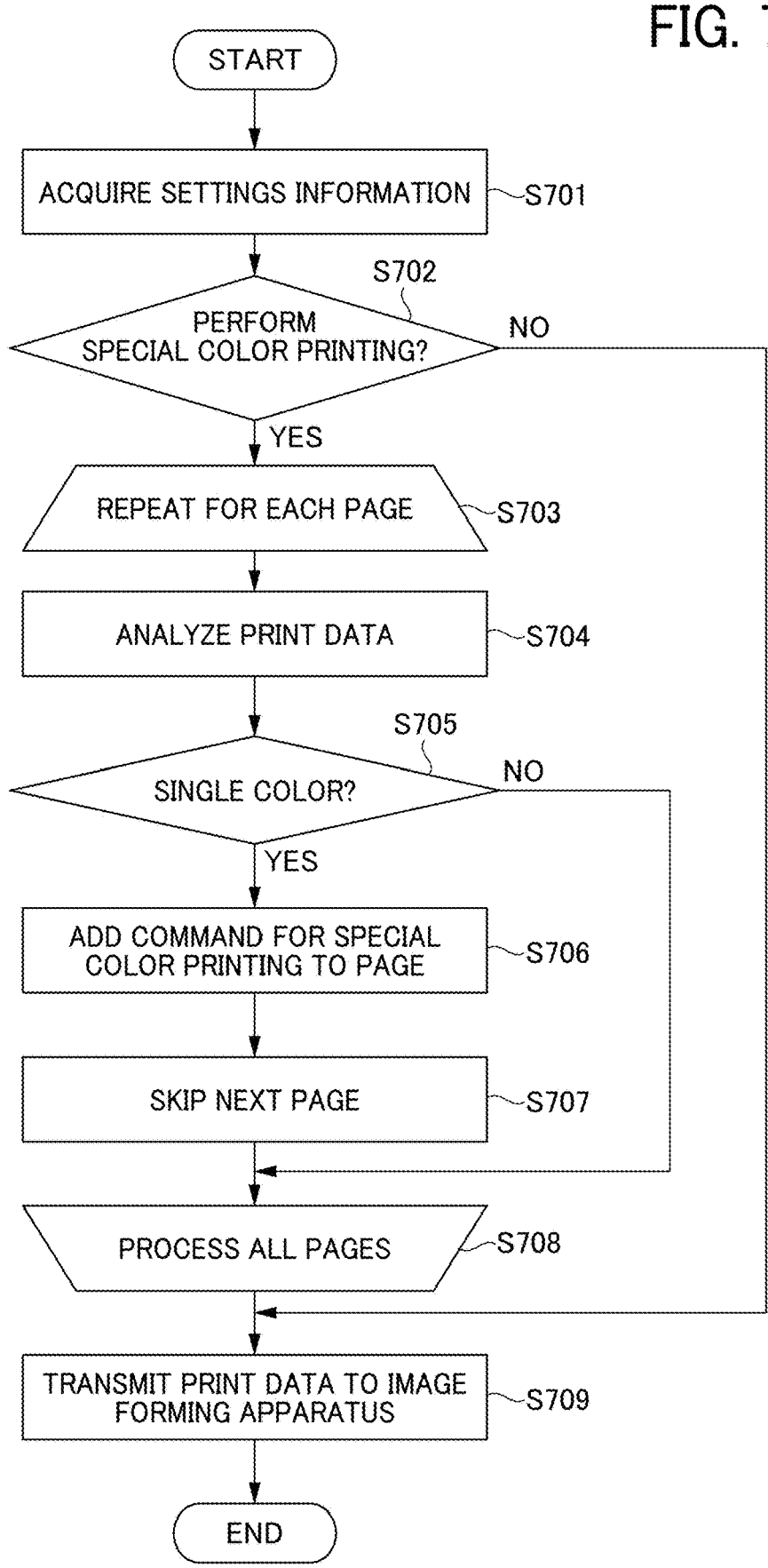
FIG. 7 is a flowchart illustrating an operation of the information processing apparatus.

The operation of each device included in the printing system 100 is described with reference to FIG. 7. FIG. 7 is a flowchart illustrating the operation of the information processing apparatus. FIG. 7 includes details of the process of step S603 of FIG. 6.

In response to receiving image data from the application 230, the printer driver 220 of the information processing apparatus 200 according to the present embodiment generates print data based on the image data and acquires the settings information stored in the settings holding unit 222 in step S701.

In step S702, the printer driver 220 determines whether or not the setting content indicated by the settings information is a setting for performing printing using the special color toner (special color printing). In step S702, if the special color printing is not set, the printer driver 220 proceeds to step S708 described below.

In step S702, if the special color printing is set, the printer driver 220 repeats the processing after step S704 for each page (step S703).

The printer driver 220 causes the page analysis unit 223 to analyze the print data in step S704 and determines whether the object in the page is in the single color in step S705.

If the object is not the single color object in step S705, the printer driver 220 proceeds to step S708 described below.

If the object is the single color object in step S705, the printer driver 220 causes the command addition unit 224 to add the special color print command to this page in step S706. In step S707, the page analysis unit 223 determines that the next page is analyzed. That is, when the page analysis unit 223 determines that a particular page among the pages included in the print data is the single color page, in order to automatically make the next page different from the single color page, the next page is regarded as analyzed.

As described above, in the present embodiment, when the page analysis unit 223 added the special color print command to a page, the page analysis unit 223 does not determine whether the single color object is included in the next page. In other words, in the present embodiment, the page next to the page to which the special color print command is added is determined as the page for normal printing, regardless of whether the object in the page is in single color or in the multiple colors.

A printed matter that matches the intention of the user who created the print data can be output, for example, in a series of pages containing single color objects, when color of the object on each page is different, and when first page is designated as a page for special color printing, and following page is designated as a page for normal printing.

The printer driver 220 performs the processing up to step S707 for all pages included in the print data in step S708.

In step S709, the information processing apparatus 200 transmits the print data to the image forming apparatus 300 and completes the process.

Figure 8:
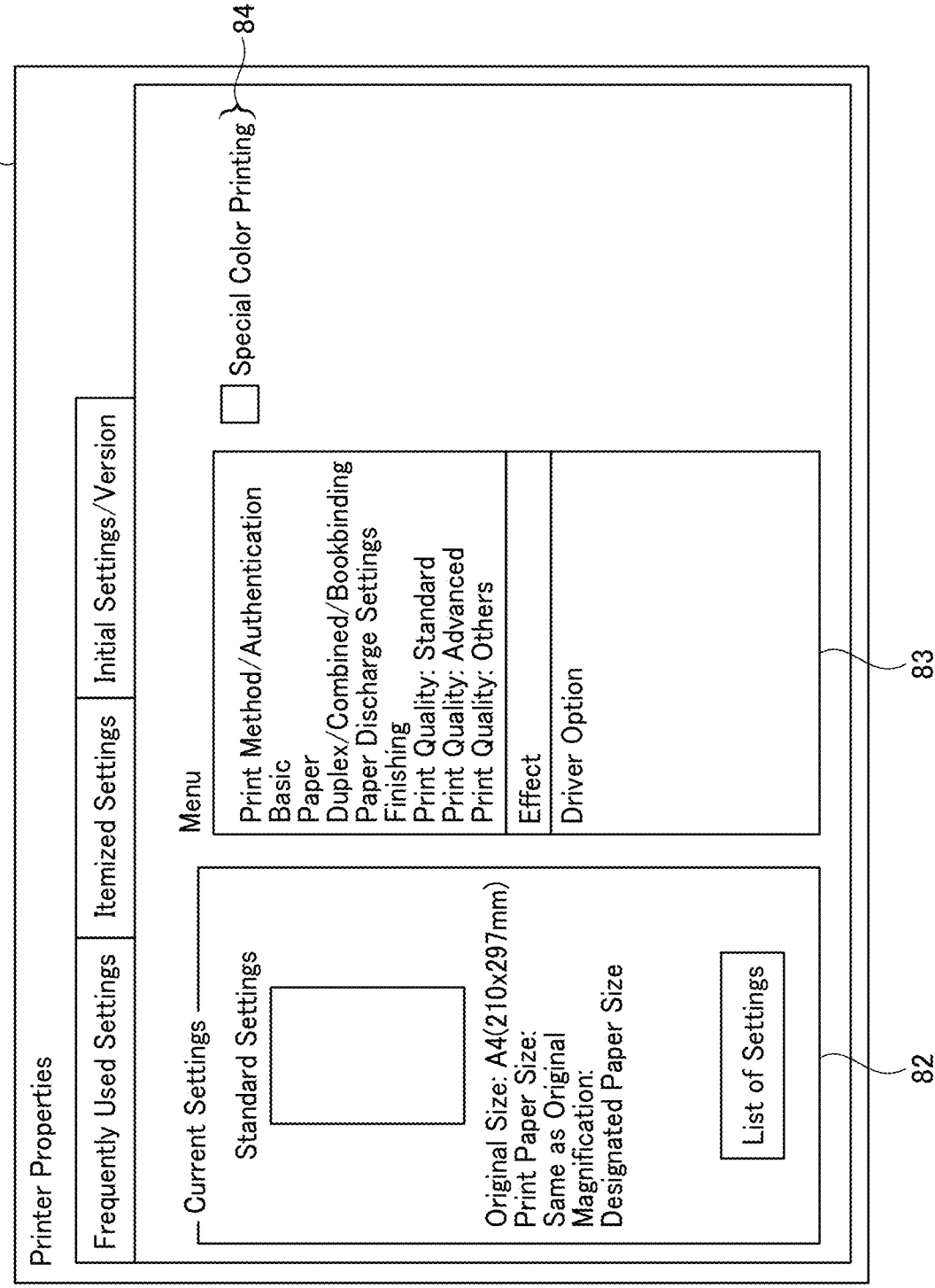
FIG. 8 is a diagram illustrating an example of a setting screen regarding printing using special color toner.

The settings relating to printing using the special color toner in this embodiment is described. FIG. 8 is a diagram illustrating an example of a setting screen regarding printing using special color toner.

The printer driver 220 of the present embodiment causes the display control unit 221 to display the setting screen 81 on the display 206 of the information processing apparatus 200.

The setting screen 81 includes display fields 82 and 83 and an input field 84. The display field 82 displays the current settings of the image forming apparatus 300. The display field 82 displays a list of setting items for the image forming apparatus 300. In the present embodiment, when an item is selected from the list displayed in the display field 83, the selected item may be set.

The input field 84 is for inputting information indicating that the special color printing is set. In the present embodiment, the printer driver 220 may store settings information indicating that special color printing is to be performed in the settings holding unit 222 when a check is input in the input field 84.

In the present embodiment, the information indicating whether or not to perform the special color printing is set as the settings information, but the settings information is not limited to the settings to perform special color printing. The settings information may include, for example, information indicating whether or not to perform special color printing, as well as information indicating a color of an object to be printed by the special color.

In this case, the display control unit 221 may display an input field for setting the color on the setting screen 81, in addition to the input field 84, the settings holding unit 222 may store the information indicating the color input in this input field in the settings information.

When the settings information includes information indicating the color of the object, the printer driver 220 may determine whether an object in a page is the single color and is the object of the color included in the settings information. Then, when the object in the page is the single color and the color included in the settings information, the printer driver 220 may determine that the page is the target of the special color printing.

Figure 9:
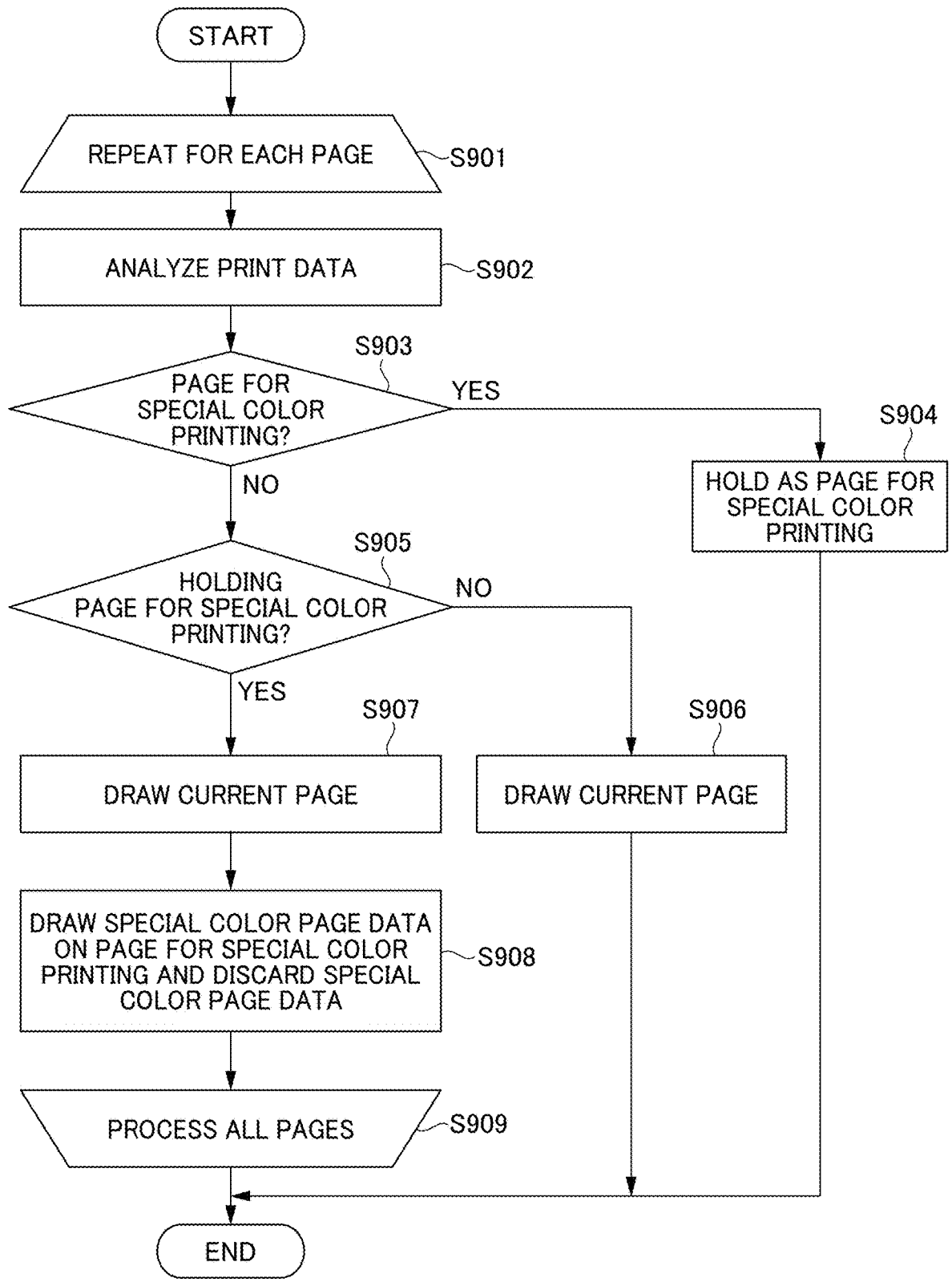
FIG. 9 is a flowchart illustrating an operation of the image forming apparatus.

The operation of the image forming apparatus 300 according to the present embodiment is described with reference to FIG. 9. FIG. 9 is a flowchart illustrating the operation of the image forming apparatus. FIG. 9 includes details of the process of step S605 of FIG. 6.

When the image forming apparatus 300 according to the present embodiment receives print data from the information processing apparatus 200 by the communication unit 361, the processing from step S902 is performed for each page (step S901).

In step S902, the drawing unit 362 of the image forming apparatus 300 analyzes the print data to create the drawing data of the analyzed page.

In step S903, the drawing unit 362 determines whether the page analyzed in step S902 is a target of printing with the special color toner. In other words, when the print data includes a command, the drawing unit 362 passes the command to the command interpreting unit 363 and depending on the interpretation result by the command interpreting unit 363, determines whether the command is a special color print command.

In step S903, if the page is to be printed with the special color toner, in step S904, the drawing unit 362 causes the page holding unit 364 to hold the drawing data of the page created in step S902, and proceeds to step S909 described below.

In step S903, if the page is not the target of printing with the special color toner, the drawing unit 362 determines whether the page holding unit 364 holds the drawing data of the page that is the target of the special color printing in step S905.

If drawing data is not stored in the page holding unit 364 in step S905, the drawing unit 362 passes the drawing data created in step S902 to the printer control unit 365. The printer 332 draws and outputs the image based on the drawing data on the recording medium in step S906 and proceeds to step S909 described below. Here, the RGB image data may be converted into C, M, and Y print data.

If drawing data is stored in the page holding unit 364 in step S905, the drawing unit 362 passes the drawing data created in step S902 to the printer control unit 365, and the printer 332 draws the image indicated by the drawing data on the recording medium in step S907. Also in this case, the RGB image data may be converted into C, M, and Y print data.

In step S908, the drawing unit 362 draws and outputs the drawing data held in the page holding unit 364 on the recording medium on which the image is drawn in step S907, and causes the page holding unit 364 to discard the drawing data. At this time, the drawing data held in the page holding unit 364 is drawn by the special color toner.

The image forming apparatus 300 ends the process when the process of FIG. 9 is performed for all the pages included in the print data in step S909.

As described above, in the present embodiment, the recording medium in which the page including the image indicating the object to be printed by the special color and the page including the image indicating the object to be printed as the normal print are superimposed, drawn, and output.

The operation of the printing system 100 according to the present embodiment is specifically described with reference to FIG. 2. In the image data 20 illustrated in FIG. 2, the object 21a of page 21 and the object 23a of page 23 are single color images and the color is designated as the targets of special color printing.

The printer driver 220 adds the special color print command to the page 21 as a result of analyzing the page 21. Then, the printer driver 220 does not analyze the page 22 but analyzes the page 23. The page 23 includes the single color object 23a. The printer driver 220 adds the special color print command to the page 23 and creates the print data 20' without analyzing the page 24.

By doing so, for example, when the object 21a of the page 21 and the object 22a of the page 22 of the image data 20 are single color objects of the same color, and only the object 21a is created for the purpose of performing special color printing, the page 22 is not determined as the target of the special color printing, but determined as the target of normal printing.

Upon receiving the print data 20' from the information processing apparatus 200, the image forming apparatus 300 first analyzes the page 21 and creates image data indicating the object 21a. Then, the image forming apparatus 300 determines whether or not the page 21 is a target page for special color printing.

In the print data 20', since the special color print command is added to the page 21, the image forming apparatus 300 determines that the page 21 is the target page of the special color print, draws the drawing data indicating the object 21a, stores the page in the page holding unit 364 and analyzes the next page 22.

Since the special color print command has not been added to page 22, the image forming apparatus 300 determines that page 22 is not the target page for special color printing and determines whether the page holding unit 364 holds drawing data.

Here, drawing data indicating the object 21a is stored in the page holding unit 364.

Therefore, the image forming apparatus 300 draws the object 22a on the recording medium by normal printing based on the image data indicating the object 22a of the page 22. Next, the image forming apparatus 300 forms the object 21a held by the page holding unit 364 on the recording medium on which the object 22a is drawn by the special color printing and outputs the page. The recording medium output here is the printed matter 31.

The object 22a represented by C, M. and Y and the object 21a represented by special color toner are superimposed on the printed matter 31.

As described above, according to the present embodiment, it is possible to print the special color without application software that can designate the special color.

In the present embodiment, the information processing apparatus 200 is, for example, a PC, a smartphone, a tablet terminal, a PDA, a wearable PC, or the like, but the information processing apparatus 200 is not limited to examples listed here. The information processing apparatus 200 includes an electronic whiteboard (a device having a whiteboard function capable of mutual communication), an output device such as digital signage, a projector, a video conference terminal, and the like as long as the OS, control program, and application software operate.

Further, the image forming apparatus 300 of the present embodiment includes a printing apparatus using an electrophotographic technique, a printing apparatus using an inkjet technique for ejecting liquid droplets, and a printing device for thermally transferring an ink ribbon. The image forming apparatus 300 may be an MFP. The "multifunction" of the multifunction peripheral indicates a plurality of functions such as an image forming function, facsimile transmission and reception, document scanning, and copying. The MFP may be called a multi-function printer or a multi-function product. In the present embodiment, the image forming apparatus is not required to have the plurality of functions, and only needs to have a function of forming an image. Further, the image forming apparatus 30 may be called a printer.

Each of the functions of the described embodiments can be implemented by one or more processing circuits or circuitry. Processing circuit includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. A printing system comprising:
an information processing apparatus; and
an image forming apparatus,
the information processing apparatus including:
circuitry configured to
  receive image data,
  identify a page to be printed in a single color as a single color page,
  add a command for instructing printing with special color material to the single color page in first print data, the first print data having been generated based on image data including the single color page in which an object is drawn in single color,
  determine whether a page is the single color page including an object on the page drawn in single color, for each page included in the first print data,
  add the command for instructing printing with the special color material to the page determined to be the single color page included in the first print data,
  display on a display, a screen for setting whether to print with the special color material,
  store settings information indicating settings input on the screen, the settings information including information indicating color, and
  determine a page as the single color page in a case the object in the page is drawn in the single color and the single color is the color indicated by the settings information; and
a network interface configured to transmit to the image forming apparatus, second print data that has the command added, wherein the image forming apparatus includes circuitry configured to print the single color page in the second print data with the special color material.

2. The printing system of claim 1, wherein the circuitry of the information processing apparatus is further configured to determine a page next to the page to which the special color print command is added is determined as a page for normal printing, regardless of whether the object in the page is in the single color or in multiple colors.

3. The printing system of claim 1, wherein the circuitry of the image forming apparatus is configured to:
  analyze each page of the second print data received from the information processing apparatus to create drawing data for each page of the second print data;
  determine whether the page that is analyzed is the single color page with the command added;
  wherein the image forming apparatus further includes a memory configured to store the drawing data of the single color page when the page that is analyzed is the single color page with the command added, and
  the circuitry is further configured to, when the drawing data of the single color page is stored, after drawing an image based on the drawing data of a page different from the single color page on a recording medium, draw an image based on the drawing data of the single color page with the special color material on the recording medium such that the image of the single color page is superimposed on the image of the page different from the single color page.

4. The printing system of claim 1, wherein the page different from the single color page is the next page of the single color page.

5. The printing system of claim 1, wherein the page different from the single color page is a page including objects drawn in multiple colors.

6. A non-transitory recording medium which, when executed by one or more processors on an information processing apparatus, cause the processors to perform a print control method, comprising:
  receiving image data;
  identifying a page to be printed in a single color as a single color page;
  adding a command for instructing printing with special color material to a single color page in first print data, the first print data having been generated based on image data including the single color page in which an object is drawn in single color; and
  transmitting to an image forming apparatus, second print data that has the command added, wherein the print control method further comprises:
  determining whether a page is the single color page including an object on the page drawn in single color, for each page included in the first print data;
  adding the command for instructing printing with the special color material to the page determined to be the single color page included in the first print data;
  displaying on a display, a screen for setting whether to print with the special color material;
  storing settings information indicating settings input on the screen, the settings information including information indicating color; and
  determining a page as the single color page in a case the object in the page is drawn in the single color and the single color is the color indicated by the settings information.

7. The non-transitory recording medium of claim 6, wherein the print control method further comprises determining a page next to the page to which the special color print command is added as a page for normal printing, regardless of whether the object in the page is in the single color or in multiple colors.

8. The non-transitory recording medium of claim 6, wherein the page different from the single color page is the next page of the single color page.

9. The non-transitory recording medium of claim 6, wherein the page different from the single color page is a page including objects drawn in multiple colors.

10. A print control method executed by a printing system comprising an information processing apparatus and an image forming apparatus, the method comprising;
receiving image data;
identifying a page to be printed in a single color as a single color page;
adding a command for instructing printing with special color material to a single color page in first print data, the first print data having been generated based on image data including the single color page in which an object is drawn in a single color;
transmitting to the image forming apparatus, second print data that has the command added;
determining whether a page is the single color page including an object on the page drawn in the single color, for each page included in the first print data;
adding the command for instructing printing with the special color material to the page determined to be the single color page included in the first print data;
displaying on a display, a screen for setting whether to print with the special color material;
storing settings information indicating settings input on the screen, the settings information including information indicating color; and
determining a page as the single color page in a case the object in the page is drawn in the single color and the single color is the color indicated by the settings information,
wherein the image forming apparatus prints the single color page in the second print data with the special color material.

11. The print control method of claim 10, further comprising;
determining the page next to a page to which the special color print command is added is determined as a page for normal printing, regardless of whether the object in the page is in the single color or in multiple colors.

12. The print control method of claim 10, wherein the page different from the single color page is the next page of the single color page.

13. The print control method of claim 10, wherein the page different from the single color page is a page including objects drawn in multiple colors.

* * * * *